United States Patent Office 3,296,266
Patented Jan. 3, 1967

3,296,266
PURIFICATION OF MELAMINE
Elmer L. Nelson, Chester, and Thomas W. Kennedy, Richmond, Va., assignors to Allied Chemical Corporation, New York, N.Y., a corporation of New York
No Drawing. Filed Jan. 21, 1965, Ser. No. 427,093
6 Claims. (Cl. 260—249.7)

This invention relates to a process for the purification of crude melamine. More particularly, it relates to an improvement whereby increased yields of pure melamine can be recovered from the melamine-aqueous ammonia solution or slurry discharged from hydrolysis purification equipment.

It is known to produce melamine by heating urea, biuret, cyanuric acid or other aquo-ammono carbonic acid alone or together with added ammonia, under suitably high temperatures and pressures. The crude product obtained is a mixture of melamine, ammonia, carbon dioxide, unreacted urea and hydroxy triazine impurities, e.g., ammelide and ammeline. It is known from U.S. Patent 3,161,638 to purify the crude melamine by stripping it of its carbon dioxide content, digesting the stripped material in 8 to 28% aqueous ammonia, and thereafter crystallizing the purified melamine from the digestion mixture. The melamine-aqueous ammonia solution from the digester is filtered, treated with activated carbon, and cooled to crystallize the purified melamine. Since this solution generally contains about 1 to 10% by weight of dissolved impurity, based on the melamine content, it is generally desirable to crystallize melamine from the solution at temperatures of 50° C. or higher, preferably about 55° C., to prevent the dissolved impurities from coprecipitating with the melamine. However, in crystallizing melamine at these temperatures, a substantial amount of the total melamine in the advancing stream remains dissolved in the aqueous ammonia mother liquor, and in recovering the melamine by conventional means (centrifugation and filtration) this quantity of dissolved melamine product is lost from this part of the process. Considerable and expensive equipment is thereby required to further process the filtrate to separate the melamine in low concentration in the aqueous ammonia solution containing the undesirable impurities.

It is, therefore, an object of the present invention to provide a more efficient separation of melamine from the aqueous ammonia-dissolved impurities solution resulting from the digestion of crude melamine.

More particularly, it is an object of the present invention to separate melamine from the aqueous ammonia digestion liquor in increased quantities without adversely affecting the purity of the separated product.

It has been discovered that when the melamine containing solution is first quenched to an intermediate temperature, then cooled to a lower temperature and filtered, the melamine crystals are recovered as pure as if they had been formed at the intermediate quench temperature, while the yield corresponds to that obtained at the lower temperature.

In accordance with the present invention, solution from the digestion system is cooled to about 50° to 80° C., preferably about 50° to 60° C., held in this temperature range for at least one minute for growth of melamine crystals, then further cooled to about 0° to 40° C., to crystallize additional melamine from the ammonia water and dissolved impurities.

Preferably, the second crystallization is carried out at a temperature in the range 5° to 30° C., since these temperatures do not require the use of refrigerant coolant, and further because the melamine-water solubility relationship is such that little benefit is obtained in cooling below 5° C.

The first crystallization is allowed to proceed for about 1 to 20 minutes, preferably about 5 to 10 minutes. The second crystallization is carried out until precipitation of melamine crystals is substantially complete.

The improvement which comprises the present invention is part of an overall procedure which can be carried out as follows: Crude melamine produced by pyrolysis of an aquo-ammono carbonic acid (e.g., urea, biuret, triuret, cyanuric acid, cyanic acid, ammelide or ammeline) and accompanied by the gaseous products of the pyrolysis reaction, passes out of the reactor through a let-down valve and is quenched at about 10 to 20 p.s.i.g. pressure and 100 to 110° C., by contact with recycled aqueous crude melamine slurry. The quench water is partly vaporized on contact with the crude melamine, producing a mixture of water, ammonia and carbon dioxide in the vapor phase. The liquid phase contains the same components, plus the crude melamine mixture containing impurities such as ammelide, and carried largely as a slurry. The quenched crude melamine slurry with dissolved gases is fed to a carbon dioxide stripping column where the carbon dioxide content is reduced to below 3% by weight, preferably below 1% by weight. The slurry stream leaving the carbon dioxide stripping column is advanced to a hydrolyzer operating at about 250 to 450 p.s.i.g. Before entering the hydrolyzer it is joined by an anhydrous liquid ammonia stream in the weight ratio of 10 to 40 parts ammonia to 1 part of insoluble impurities in the crude melamine. The weight ratio of water to total melamine in the slurry stream is about 7 to 1, but can be varied if necessary to maintain operating pressure below 450 p.s.i.g. At this point the slurry can also be saturated with oxygen in order to assure a product which is free from any discoloration. The ammoniacal mixture flows to the hydrolyzer in which it is heated to 140° to 230° C., preferably about 150° to 180° C. Total hold up time is about 25 to 50 minutes, depending on the temperature in the vessel. The lower the temperature in the hydrolyzer the longer the hold up time. The ammoniacal solution of melamine leaving the hydrolyzer is filtered to remove any minor amounts of undissolved material, and treated with carbon. It is then reduced in pressure through a let down valve and cooled by direct mixing with recycle stream from a crystallizer. The recycled ratio is adjusted to give a temperature of about 50° to 80° C., preferably 50° to 60° C., to the material in the crystallizer which can be a conventional shell and tube exchanger. Operating pressure is controlled between about 15 to 100 p.s.i.g. on the process side to hold all the ammonia in solution. The cooled slurry is held in this temperature range for at least one minute and preferably for about 5 to 10 minutes to permit growth of melamine crystals. Most of the slurry exiting the first crystallizer is recycled to quench the filtered ammoniacal solution of melamine from the hydrolyzer as mentioned above. The remainder is passed to a second crystallization system and cooled to about 0 to 40° C., preferably 5 to 30° C., by mixing it with recycled melamine slurry from a second crystallizer to crystallize additional melamine from the ammonia water and dissolved impurities. The crystallized melamine is removed from the slurry by centrifugation and/or filtration, dried and stored. Mother liquor from the centrifuge is preferably sent to an ammonia recovery system.

The following example illustrates a specific embodiment of the present invention.

*Example*

Aqueous melamine-containing solution previously subjected to the hydrolysis and filtration steps of a purification system such as that described above, at a temperature of about 140° C. and a pressure of 400 p.s.i.g. and containing 15% by weight ammonia, 10.0% melamine and 0.24% impurities, including ammelide and ammeline, is reduced in pressure to 30 p.s.i.g. and quenched to about 52-53° C. by direct contact with recycled melamine-aqueous ammonia slurry previously cooled to about 50° C. On cooling, a substantial portion of the melamine crystallizes, while the impurities are retained in solution. The resulting slurry is fed to a crystallizer, which is a shell and tube heat exchanger, where it is further cooled to 50° C. It is held at about 50-53° C. temperature in the crystallizer system for about five minutes. Part of the crystallizer effluent is recycled to cool incoming feed from the hydrolysis and filtration steps, as mentioned above and the remainder is fed to a second cooling system where it is cooled to about 25° C. by mixing with recycled slurry from a second crystallizer, and then fed to a second crystallizer, also a shell and tube type heat exchanger, and cooled to about 20° C. until precipitation of melamine crystals is complete. Part of the resulting slurry is recycled to cool the material coming from the first crystallizer. The remainder is filtered at 25° C., and the melamine crystals so recovered are dried. Melamine recovery from the solution is found to be 96.66% based on analysis of the filtrate which contains 0.37 weight percent melamine. Impurities in the dried product amount to less than 0.02% by weight.

When melamine-containing solution substantially the same as that treated in the above example, but containing, by weight, 10.2% melamine and 0.20% impurities is reduced in pressure to 30 p.s.i.g. and cooled to 50° C., as described in the first part of the above example and permitted to stand until precipitation of melamine is complete, the yield of melamine after filtration at 50° C., and drying is only 92.55% based on analysis of the filtrate which contains 0.84 weight percent melamine. Impurities in the recovered melamine amount to less than 0.02%.

When the solution from the hydrolysis and filtration steps is cooled in one step as described in the foregoing paragraph, but to about 39° C., rather than 50° C., and filtered, the melamine recovery is 94.05%, but impurities in the recovered melamine amount to 0.14%.

It can thus be seen that an improved process has been discovered which makes possible the recovery of highly purified melamine in increased yield. The advantage of being able to crystallize the melamine at such low temperatures without reducing the purity of the recovered product is obvious from the following table which shows the solubility of melamine in 13% aqueous ammonia at various temperatures.

| T., °C.: | Parts melamine soluble in 100 parts 13% aqueous ammonia |
|---|---|
| 59 | 1.1 |
| 50 | 0.83 |
| 40 | 0.59 |
| 30 | 0.38 |
| 25 | 0.30 |
| 20 | 0.23 |

We claim:
1. In the process for purifying crude melamine containing hydroxy triazine impurities by digesting a dispersion of said crude melamine in aqueous ammonia, at a temperature in the range 140° to 230° C., filtering the resulting solution of melamine in aqueous ammonia and cooling the filtrate to crystallize purified melamine therefrom, the improvement which comprises cooling the solution of melamine in aqueous ammonia first to a temperature in the range 50° to 80° C., and then, after a period of at least one minute, to a temperature in the range 0° to 40° C., and recovering the purified melamine thus precipitated.

2. The process of claim 1 wherein a solution of melamine in aqueous ammonia is first cooled to a temperature in the range 50° to 80° C., and then, after a period of one to about twenty minutes, to a temperature in the range 5° to 30° C.

3. The process of claim 1 wherein the material being treated is allowed to stand at a temperature within the range 5° to 30° C., until precipitation of melamine is substantially complete.

4. The process of claim 1 wherein the solution of melamine in aqueous ammonia is cooled first to a temperature in the range 50° to 60° C., and then after a period of at least one minute, to a temperature in the range 5° to 30° C.

5. The process of claim 2 wherein the material being treated is maintained at a temperature within the range 50° to 80° C., for about five to ten minutes.

6. In the process for purifying crude melamine containing hydroxy triazine impurities, including ammelide, by digesting a dispersion of said crude melamine in 8 to 28% aqueous ammonia at a temperature in the range 140° to 230° C., said dispersion containing less than 3% carbon dioxide by weight, filtering the resulting solution of melamine in aqueous ammonia, cooling the filtrate to crystallize purified melamine therefrom, and separating the melamine crystals from the mother liquor, the improvement which comprises cooling the solution of aqueous ammonia first to a temperature in the range 50° to 60° C., and then, after a period of 5 to 10 minutes, to a temperature in the range 20° to 25° C., and recovering the purified melamine thus precipitated.

References Cited by the Examiner
UNITED STATES PATENTS
3,161,638  12/1964  Christoffel et al. ___ 260—249.7

WALTER A. MODANCE, *Primary Examiner,*
JOHN M. FORD, *Assistant Examiner,*